(12) United States Patent
Sasaki

(10) Patent No.: US 7,486,818 B2
(45) Date of Patent: Feb. 3, 2009

(54) COLOR DATA ACCURACY CALCULATING METHOD, COLOR DATA ACCURACY CALCULATING APPARATUS, COLOR PROCESSING METHOD, COLOR PROCESSING APPARATUS, COLOR DATA ACCURACY CALCULATING PROGRAM, COLOR PROCESSING PROGRAM, AND STORAGE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 947 days.

(21) Appl. No.: 10/716,431

(22) Filed: Nov. 20, 2003

(65) Prior Publication Data

US 2004/0131251 A1    Jul. 8, 2004

(30) Foreign Application Priority Data

Nov. 25, 2002  (JP)  ............................. 2002-340571

(51) Int. Cl.
  *G06K 9/00* (2006.01)
  *G06K 15/00* (2006.01)
  *G09G 5/02* (2006.01)

(52) U.S. Cl. ................... 382/162; 345/589; 345/690; 358/2.1

(58) Field of Classification Search ......... 345/589–604, 345/690; 358/1.9, 2.1, 515–523; 382/162–167
See application file for complete search history.

(56) References Cited

U.S. PATENT DOCUMENTS

| | | | | |
|---|---|---|---|---|
| 4,884,221 A | * | 11/1989 | Sugiyama et al. | ........... 382/165 |
| 5,588,050 A | * | 12/1996 | Kagawa et al. | ............... 382/167 |
| 5,748,858 A | * | 5/1998 | Ohtsuka et al. | ............... 358/1.9 |
| 5,801,854 A | * | 9/1998 | Naylor, Jr. | ................... 358/518 |
| 5,909,506 A | * | 6/1999 | Goto | ........................... 382/167 |
| 5,949,967 A | * | 9/1999 | Spaulding et al. | ............ 358/1.9 |
| 5,960,110 A | * | 9/1999 | Usami | ......................... 382/167 |
| 5,982,924 A | * | 11/1999 | Power et al. | ................. 382/162 |
| 5,982,949 A | * | 11/1999 | Ohtsuka | ..................... 382/276 |
| 6,005,970 A | * | 12/1999 | Ohneda et al. | .............. 382/162 |
| 6,100,999 A | * | 8/2000 | Ikegami | ...................... 358/1.9 |
| 2002/0107858 A1 | * | 8/2002 | Lundahl et al. | ............. 707/100 |
| 2003/0154044 A1 | * | 8/2003 | Lundstedt et al. | ........... 702/104 |

FOREIGN PATENT DOCUMENTS

JP   A 7-219929   8/1995
JP   A 10-262157  9/1998

* cited by examiner

*Primary Examiner*—Matthew C Bella
*Assistant Examiner*—Manav Seth
(74) *Attorney, Agent, or Firm*—Oliff & Berridge, PLC

(57) ABSTRACT

A target color signal pair extraction section extracts from color signal pairs each including an input color signal and a counterpart output color signal, a target color signal pair including a target input color signal and a counterpart target output color signal. An output vicinity color signal extraction section extracts from the color signal pairs, output vicinity color signals corresponding to input vicinity color signals, which are located in the vicinity of the target input color signal. A color signal pair accuracy calculation section calculates a color signal pair accuracy of the target color signal pair on the basis of a relation between the target output color signal and the plurality of output vicinity color signals.

18 Claims, 8 Drawing Sheets

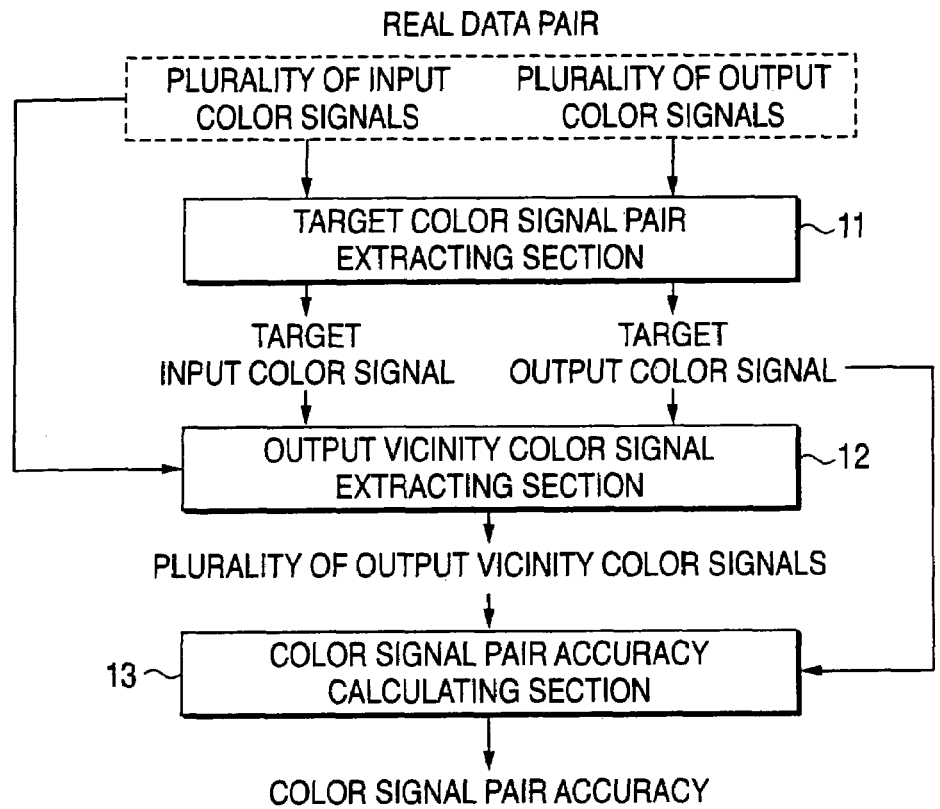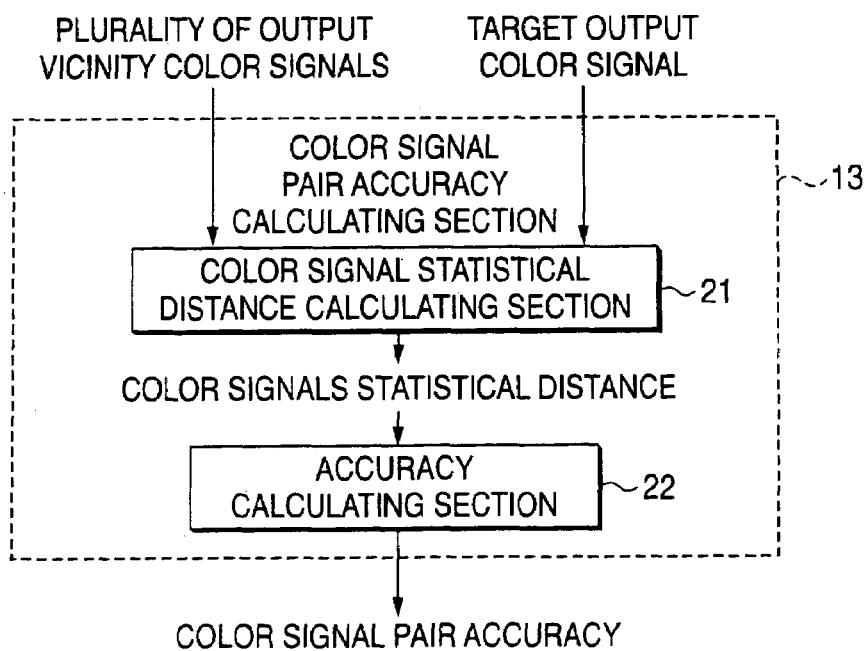

COLOR DATA ACCURACY CALCULATING METHOD, COLOR DATA ACCURACY CALCULATING APPARATUS, COLOR PROCESSING METHOD, COLOR PROCESSING APPARATUS, COLOR DATA ACCURACY CALCULATING PROGRAM, COLOR PROCESSING PROGRAM, AND STORAGE MEDIUM

The present disclosure relates to the subject matter contained in Japanese Patent Application No. 2002-340571 filed on Nov. 25, 2003, which is incorporated herein in its entirety by reference.

BACKGROUND OF THE INVENTION

1. Field of the Invention

The present invention relates to a technique of predicting a color signal of an output color space from a color signal of an input color space or predicting a color signal of an input color space from a color signal of an output color space in a color output apparatusesuch as a printer in which color signals of a color space such as CMYK are employed as input color signals and color signals of a color space such as L*a*b* are employed as output color signals; in a color output apparatusesuch as a display in which color signals of a color space such as RGB are used as input color signals and color signals of a color space such as XYZ are used as output color signals; or in a color input apparatusesuch as a scanner in which color signals of a color space such as L*a*b* are employed as input color signals and color signals of a color space such as RGB are employed as output color signals. More specifically, the present invention relates to a technique for calculating data accuracy of a real data pair between an input color signal and an output color signal used in a case where a model functioning as a prediction base is formed.

2. Description of the Related Art

Conventionally, various methods for predicting characteristics of a color image output apparatus such as printers and displays, and also for predicting characteristics of color image input apparatuses such as scanners have been tried. In general, a prediction of the color transfer characteristic for each of color image input/output apparatuses is carried out using a real data pair for each apparatus. For instance, in a printer (will be referred to as "CMYK printer" hereinafter) for forming an image using color materials having four colors of C (cyan), M (magenta), Y (yellow), and K (black), a plurality of color patches represented by CMYK are printed out. Then, the color patches are calorimetrically measured to obtain device-independent L*a*b* calorimetric values. Then, while the CMYK values corresponding to the color patches and the measured L*a*b* calorimetric values are defined as a real data pair, colors which don't appear in the color patches can be predicted based upon the real data pair.

JP-A-10-262157 discloses a method using the regression analysis as a predicting method of the color transfer characteristic, making it possible to predict the color in high accuracy using the real data pair. The predicting method is not limited to this method, but various predicting methods have been proposed, for example, predicting methods using a neural network.

However, even though color transfer characteristics can be predicted in high accuracy, when an abnormal value is contained in the real data pair, a high-accuracy color transfer characteristic cannot be predicted. Also, when a colorimetric-measurement sequence of color patches is erroneously performed during a step of forming real data pairs, although colorimetric values themselves aren't abnormal, a real data pair obtained in the erroneous colorimetric-measuring sequence may be eventually regarded as an abnormal value. As to prediction of a color transfer characteristic, the higher the accuracy of the prediction model becomes, the more the predicted value is fitted to the abnormal value, so that desirable colors cannot be obtained.

To solve such a problem, JP-A-10-262157 discloses a method of quantifying the accuracy of the real data pairs. The data accuracy calculating method disclosed in JP-A-10-262157 tests the real data pairs one by one using a color transfer characteristic prediction model disclosed therein. Precisely speaking, the accuracy of the data is tested based on a direction of the predicted value and a direction of the real data in the case that the real data is predicted using the real data itself. The accuracy is calculated in such a manner that if the direction of the predicted value and the direction of the real data are the same directions, the large weight is applied to the predicted value, whereas if these directions of the predicted value and the read data are opposed to each other, the small weight is applied to the predicted value.

However, the above-described data accuracy calculating method largely depends on the prediction model disclosed in JP-A-10-262157. It also largely depends on parameters of the prediction model whether or not the accuracy of the real data can be calculated correctly. If the parameter of the prediction model used in calculating the accuracy is properly selected, unstable conditions of prediction can be solved. However, since only the directivity of the real data and the directivity of the predicted value are considered, the fluctuations contained in the data cannot be correctly quantified when the abnormal value are mixed with the predicted value. As a result, the abnormal value cannot be given a proper accuracy.

In addition to JP-A-10-262157, there is another method for testing the abnormal value using a statistical method disclosed in JP-A-7-219929. This statistical method disclosed in JP-A-219929 calculates a statistic value with respect to one dimensional data distribution to test the abnormal value. However, this statistical method cannot endure a calculation of accuracy of real data in which an input signal and an output signal form a pair in a distribution such as a color processing capable of handling multi-dimension.

As described above, generally speaking, as to not only the color processing, but also the method for testing the abnormal value, many methods handles the distribution of one dimension data. It is not easy to check the abnormal value with respect to the real data pair used in the color processing, but also not easy to calculate the accuracy with respect to all of the real data pairs included in the real data set. In the color processing, while the input/output relationship has multi-dimensional relationship, the output side corresponds to the multi-dimensional calorimetric value vector.

SUMMARY OF THE INVENTION

The invention has been made to solve the above-described problem. Therefore, the invention has an object to provide a color data accuracy calculating method and a color data calculating apparatus, which calculate a color signal pair accuracy of the real data pair of an input color signal and an output color signal, which are represented in a multi dimension and test an abnormal value appropriately, thereby to predict colors in high accuracy, and to provide a color processing method and a color processing apparatus for performing color prediction in high accuracy using the color data accuracy calculating method and the color data accuracy calculating apparatus. Also, another object of the invention is to provide a color data accuracy calculating program causing a computer to execute the color data accuracy calculating process and a storage medium for storing thereinto this program, and to provide a color processing program causing a computer to execute a color processing performing the high accuracy color prediction using the color data accuracy calculating process and a storage medium for storing thereinto this color processing program.

According to an embodiment of the invention, a color data accuracy calculation method includes extracting from a plurality of color signal pairs each including an input color signal in an input color space and a counterpart output color signal in an output color space, a target color signal pair including a target input color signal and a counterpart target output color signal in the output color space, which is to be calculated an accuracy thereof; extracting from the plurality of color signal pairs, a plurality of output vicinity color signals corresponding to a plurality of input vicinity color signals, which are located in the vicinity of the target input color signal in the input color space; and calculating a color signal pair accuracy of the target color signal pair on the basis of a relation between the target output color signal and the plurality of output vicinity color signals. Generally speaking, an input vicinity color signal located in the vicinity of the target input color signal should be mapped to a position in the vicinity of the target output color signal. The relation between the target output color signal and the plurality of output vicinity color signals is expressed as the color signal pair accuracy using this mapping relation. Thereby, a judgment may be made as to whether or not the target output color signal is abnormal. A judgment may be made with regard to a degree of an abnormal condition.

The color signal pair accuracy may be calculated using a color signal statistical distance, which is a statistical distance between the target output color signal and the plurality of output vicinity color signals. At this time, the color signal pair accuracy may be calculated using a monotone and smooth function, which takes a small value when the color signal statistical distance is large and takes a large value when the color signal statistical distance is small. Alternatively, the color signal pair accuracy may take a value indicating abnormal when the color signal statistical distance is larger than a predetermined value and the color signal pair accuracy may take another value indicating normal when the color signal statistical distance is not larger than the predetermined value.

Also, the calculation of the color signal pair accuracy may include clustering the plurality of output vicinity color signals into at last two clusters; and calculating the color signal pair accuracy using a cluster statistical distance between a gravity point of one of the clusters to which the target output color signal belongs and distribution of the plurality of output vicinity color signals, and a color statistical distance between the target output color signal and the distribution of the plurality of output vicinity color signals. In this case, the color data pair accuracy may be calculated using a monotone and smooth function, which takes a small value when a total distance obtained from the cluster statistical distance and the color signal statistical distance is large, and takes a large value when the total distance is small. Alternatively, when the total distance is larger than a predetermined value, the color signal pair accuracy may take a value indicating that the target color signal pair is abnormal, whereas when the total distance is not larger than the predetermined value, the color signal pair accuracy may take another value indicating that the target color signal pair is normal. It should be noted that if the statistical distance is a distance with being taken dispersion of distribution of the output vicinity color signal into consideration, we can obtain the color signal pair accuracy in high accuracy.

Also, according to the embodiment of the invention, a color process method and a color process apparatus, which calculate a prediction output color signal corresponding to a desired input color signal to be predicted based on real data pairs each including an input color signal to one of a color image input apparatus and a color image output apparatus, and a counterpart output color signal, otherwise which calculate a remaining portion of the input color signals corresponding to the desired output signal to be predicted and a portion of the input color signals; in which color signal pair accuracy with respect to the real data pair is calculated by executing the above-described color data accuracy calculating method, or a color data accuracy calculating apparatus according to the embodiment of the invention; and a predicted output color signal, a predicted input color signal or a portion of input color signals is calculated from the real data pair by reflecting the color signal pair accuracy. At this time, the color processing apparatus may be arranged in such a manner that when a judgment is made that either the real data pair whose color signal pair accuracy is abnormal or the real data pair whose accuracy is deteriorated is present in the real data pair, information is output, which contains at least one of information related to either the data pair whose color signal pair accuracy is abnormal or the real data pair whose accuracy is deteriorated, and the color signal pair accuracy corresponding thereto.

In accordance with the color processing method and the color processing apparatus, the real data pair, which can be regarded as the abnormal value, can be detected from the real data pairs with respect to either the color image input apparatus or the color image output apparatus, which own the respective characteristics. Otherwise, according to the embodiment of the invention, as to the real data pair, which is approximated to the abnormal value, a condition that the real data pair whose accuracy is deteriorated is present can be quantified. Furthermore, when the color signal pair accuracy with respect to the calculated real data is located within tolerance, since the prediction is carried out, the high-accuracy color predicting can be carried out. As a result, the error of the output color caused by predicting the color containing the abnormal real data pair can be solved. Moreover, before the color transfer characteristic is predicted, the user can previously grasp that the abnormal real data pair is present in the real data pairs by outputting the information which contains at least one of the corresponding color signal pair accuracy and such an information related to the data pair which is judged as either the abnormal data pair or the data pair having the deteriorated accuracy. Also, the re-colorimetrical measuring operation of the color patch may be carried out only as to the abnormal data pair.

BRIEF DESCRIPTION OF THE DRAWINGS

FIG. 1 is a block diagram for representing a color data accuracy calculating apparatus according to an embodiment of the invention.

FIG. 2 is a block diagram for showing a first example of a color signal pair accuracy calculating section used in the color data accuracy calculating apparatus according to the embodiment of the invention.

DETAILED DESCRIPTION OF THE PREFERRED EMBODIMENTS

Figure 3A:
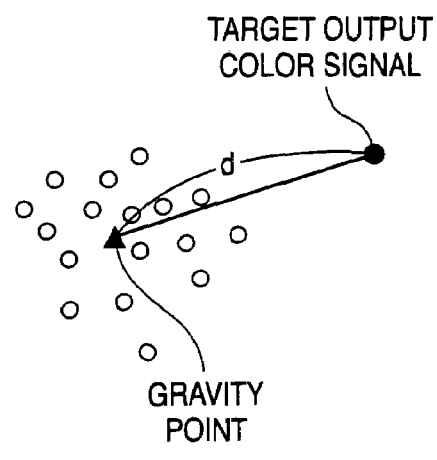
FIG. 3 is an explanatory diagram for representing an example of a relationship between the Euclid distance between a target output color signal and a gravity point of output vicinity color signal and the Mahalanobis distance therebetween.

FIG. 1 is a block diagram for showing a color data accuracy calculating apparatus according to an embodiment of the invention. In this drawing, reference numeral 11 denotes a target color signal pair extracting section, reference numeral 12 denotes an output vicinity color signal extracting section, and reference numeral 13 denotes a color signal pair accuracy calculating section. It should be understood that FIG. 1 also shows a process executed in a color data accuracy calculating method according to the embodiment of the invention.

In the configuration shown in FIG. 1, a plurality of real data pairs including input color signals and output color signals corresponding to the input color signals are input. The plurality of input signals are, for instance, a four-dimensional data group used to print out a plurality of color patches expressed by a CMYK color space in the case of a CMYK printer. The plurality of output color signals is, for example, a three-dimensional data group of a plurality of colorimetric values expressed by an $L^*a^*b^*$ color space, which are obtained by measuring color patches using a calorimeter. It should also be noted that the invention is not limited to these color signals. The invention may be applied to a case where color signals of other color spaces than the above-described color spaces are used on the input side and the output side, for instance, the input color signals are color signals of an RGB color space, and the output color signals are color signals of an XYZ color space. However, as to the color signals used in the invention, it is assumed that mapping from an input to an output satisfies a continuous relation.

The target color signal pair extracting section 11 extracts only a real data pair, which is a target of the accuracy calculation (referred to as a target color signal), from the input real data pairs. When the accuracy calculation is required with respect to all of data contained in the real data pairs, the target color signal pair extracting section 11 may extract each of the real data pairs one by one as a target color signal pair and accuracy of the extracted color signal pairs may be calculated by the subsequent stages thereto.

The output vicinity color signal extracting section 12 extracts from the input real data pairs an output color signal, which is a counterpart of an input color signal located in the vicinity of the target input color signal, as a output vicinity color signal. This output vicinity color signal is a color signal, which should be located in the vicinity of the target output color signal. As described above, since it is assumed that the mapping functioning as the color transfer characteristic from the input to the output satisfies the continuous relation, an input color signal located in the vicinity of a target input color signal is mapped to an output color signal located in the vicinity of a target output color signal. For example, when input color signals are color signals of the CMYK color space and output color signals are color signals of the $L^*a^*b^*$ color space, the following nature is used. Data located in the vicinity of the target input color signal in the CMYK color space maybe located in the vicinity of the target output color signal in the $L^*a^*b^*$ color space. Therefore, if such data of the $L^*a^*b^*$ color space isn't located in the vicinity of the target output color signal, it is easy to regard to the data as an abnormal. Conversely, even if a color signal is located in the vicinity of the target output color signal in the $L^*a^*b^*$ color space, a color signal corresponding thereto in the CMYK color space isn't always located at a position in the vicinity of the target input color signal within the CMYK color space. This fact is caused by a nature that we can represent the same colors by replacing the values of CMY with that of K. That is, an inverse mapping isn't continuous. Therefore, the embodiment of the invention adopts a method for extracting data on the output side, which is counterpart data in the vicinity of the target input color signal on the input side, using the above-described color nature. Also, when both a color space on the input side and a color space on the output side are three-dimensional color spaces, for example, when the color space on the input side is the RGB color space and the color space on the output side is the XYZ color space, an inverse mapping has a continuous relation. However, as described above, the embodiment calculates the color signal pair accuracy adopting the continuity from the color space on the input side to that on the output side.

The color signal pair accuracy calculating section 13 calculates a color signal pair accuracy using a plurality of output vicinity color signals extracted by the output vicinity color signal extracting section 12, and a target output color signal. The color signal pair accuracy calculating section 13 executes the calculation in the following manner. When a target output color signal falls within a distribution of the plurality of output vicinity color signals extracted by the output vicinity color signal extracting section 12, data is regarded as normal data. Whereas when a target output color signal is far from the distribution, the data is regarded as abnormal data. Alternatively, a degree representing how far a target output color signal is from the distribution of the plurality of output vicinity color signals may be calculated using a predetermined accuracy function. It should be noted that as to the calculating method of the color signal pair accuracy, any methods can be adopted so long as the methods can quantify a status as to whether a target output color signal fall within the distribution or far from the distribution.

Subsequently, the color signal pair accuracy calculating section 13 will now be explained in detail. FIG. 2 is a block diagram for indicating a first example of the color signal accuracy calculating section 13 in accordance with the color data accuracy calculating apparatus of this embodiment. In this drawing, reference numeral 21 denotes a color signal statistical distance calculating section, and reference numeral 22 denotes an accuracy calculating section. In this first example, the color signal pair accuracy calculating section 13 includes the color signal statistical distance calculating section 21 and the accuracy calculating section 22.

The color signal statistical distance calculating section 21 calculates a color signal statistical distance between the target output color signal and the plurality of output vicinity color signals. In this case, this color signal statistical distance is not a distance defined from a point to another point such as the Euclidean distance, but a distance defined from a point to a distribution with being taken dispersion into consideration. The Mahalanobis distance may be used as the statistical distance. For instance, the color signal statistical distance may be calculated using the Mahalanobis distance between the target output color signal and a gravity point of a distribution of the plurality of output vicinity color signals.

FIG. 3 is an explanatory diagram for explaining an example of a relation between the Euclidean distance and the Mahalanobis distance between a target output color signal and a gravity point of the plurality of output vicinity color signals. In this drawing, a black circle indicates a target output color signal, and a black triangle indicates a gravity point of a plurality of output vicinity color signals.

Figure 3B:
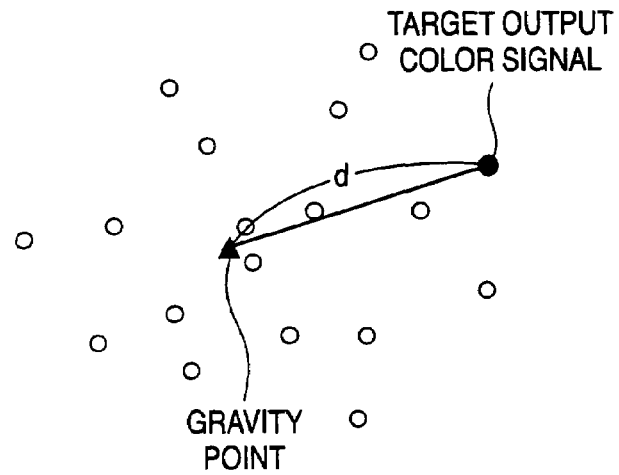

In the example shown in FIGS. 3A and 3B, the Euclidean distances between a target output color signal and a plurality of output vicinity color signals are identical to each other. However, in the example shown in FIG. 3A, the plurality of output vicinity color signals are centered in the vicinity of the gravity point. Thus, a value of dispersion is small. Conversely, in the example shown in FIG. 3B, the plurality of output vicinity color signals are dispersed. Therefore, a value of dispersion is large. As described above, the Mahalanobis distance is a distance defined with being taken the dispersion of the distribution into consideration. When the value of dispersion is large, this Mahalanobis distance is small, whereas when the value of dispersion is small, this Mahalanobis distance is large. As a consequence, the Mahalanobis distance of the example shown in FIG. 3A is large, whereas the Mahalanobis distance of the example indicated in FIG. 3B is small.

For example, in the case of FIG. 3A, since the plural output vicinity color signals are centered in the vicinity of the gravity point and the dispersion value of the output vicinity color signals is small, the Mahalanobis distance becomes large. This indicates that the target output color signal is far from the distribution of the plural output vicinity color signals. It is also apparent visually that the target output color signal is far from the distribution of the plural output vicinity color signals.

Conversely, in the case of FIG. 3B, since the plural output vicinity color signals are dispersed and the dispersion value of the output vicinity color signals is large, the Mahalanobis distance is small. This indicates that the target output color signal is contained in the distribution of the plural output vicinity color signals or is located in the vicinity of this distribution. This fact can also be understood visually.

As described above, when the Mahalanobis distance is short, the target output color signal is contained in the distribution of the plural output vicinity color signals or is located in the vicinity of this distribution. This fact indicates that the target input color signal is mapped to in the vicinity of the plural output vicinity color signals. As a consequence, when the Mahalanobis distance is small, we can find that the target output color signal is normal. On the contrary, when the Mahalanobis distance is large, the target input color signal is mapped to a color signal far from the plural output vicinity color signals. Therefore, this indicates that there is a possibility that the continuity of the mapping is not maintained. Accordingly, if the Mahalanobis distance is large, there is a possibility that the target output color signal is abnormal.

Returning back to FIG. 2, the accuracy calculating section 22 calculates the color signal pair accuracy obtained based on the color signal statistical distance obtained by the color signal statistical distance calculating section 21 with quantifying the abnormal degree as described above. In order to quantify a statistical distance as accuracy, for example, an accuracy function may be used to calculate the accuracy of a color signal pair. FIG. 4 is an explanatory diagram for explaining an example of the accuracy function used in the first example of the color signal pair calculating section 22. FIG. 4 shows examples of the accuracy function and has $d_M$ as an abscissa axis and r as an ordinate axis where $d_M$ denotes the color signal statistical distance calculated by the color signal statistical distance calculating section 21 and r denotes reliability of data.

Figure 4A:
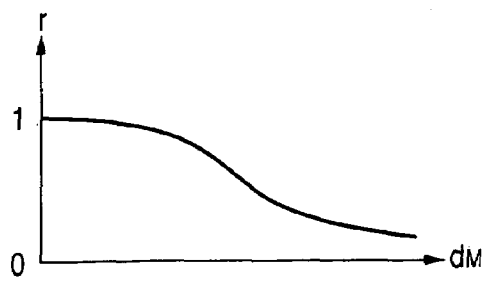
FIG. 4 is an explanatory diagram for showing an example of an accuracy function employed in the first example of the color signal pair accuracy calculating section.

The example of the accuracy function shown in FIG. 4A indicates a case where the reliability r is continuously calculated with respect to the color signal statistical distance $d_M$. For instance, a monotone and smooth function represented by the following formula 1 may be used.

$$r = 1/(1+d_M^p) \tag{1}$$

where p indicates a constant.

Figure 4B:
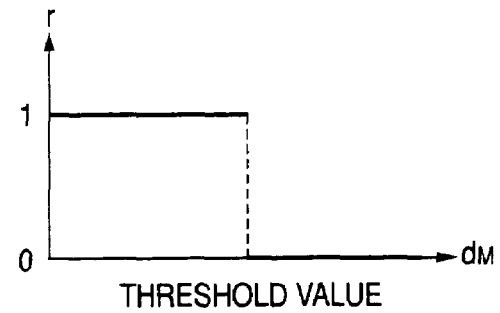

The example of the accuracy function shown in FIG. 4B indicates a case where a threshold value of the normal distance value is set with regard to the color signal statistical distance $D_M$. When the color signal statistical distance exceeds this threshold value, the accuracy function has an abnormal value (0), whereas when the color signal statistical distance does not exceed the threshold value, this accuracy function has the normal value (1). In the example of the accuracy function shown in FIG. 4A, the normal value is set to 1 and the abnormal value is set to 0 and also the accuracy between the normal value and the abnormal value can be calculated. Therefore, abnormal degrees can be quantified. In the case of FIG. 4B, when a function for notifying that the target output color signal is the abnormal value is used, the notification process can be carried out by a simple process.

As described above, the first example of the color signal pair accuracy calculating section 13 has been described. This configuration is effective in a case where, for example, the abnormal values don't constitute a cluster, but are solely present. A configuration in which the above-described configuration of the first example of the color signal pair accuracy calculating section 13 is further expanded will now be explained as a second example. The second example is effective in the case where the target output color signal is the abnormal value. In addition, the second example is also effective in another case where an output vicinity color signal corresponding to an input color signal located in the vicinity of a target input color signal represents an abnormal value due to an operation in an erroneous procedure, so that the abnormal values resulting from the output vicinity color signal and a target output color signal form a cluster.

Figure 5:
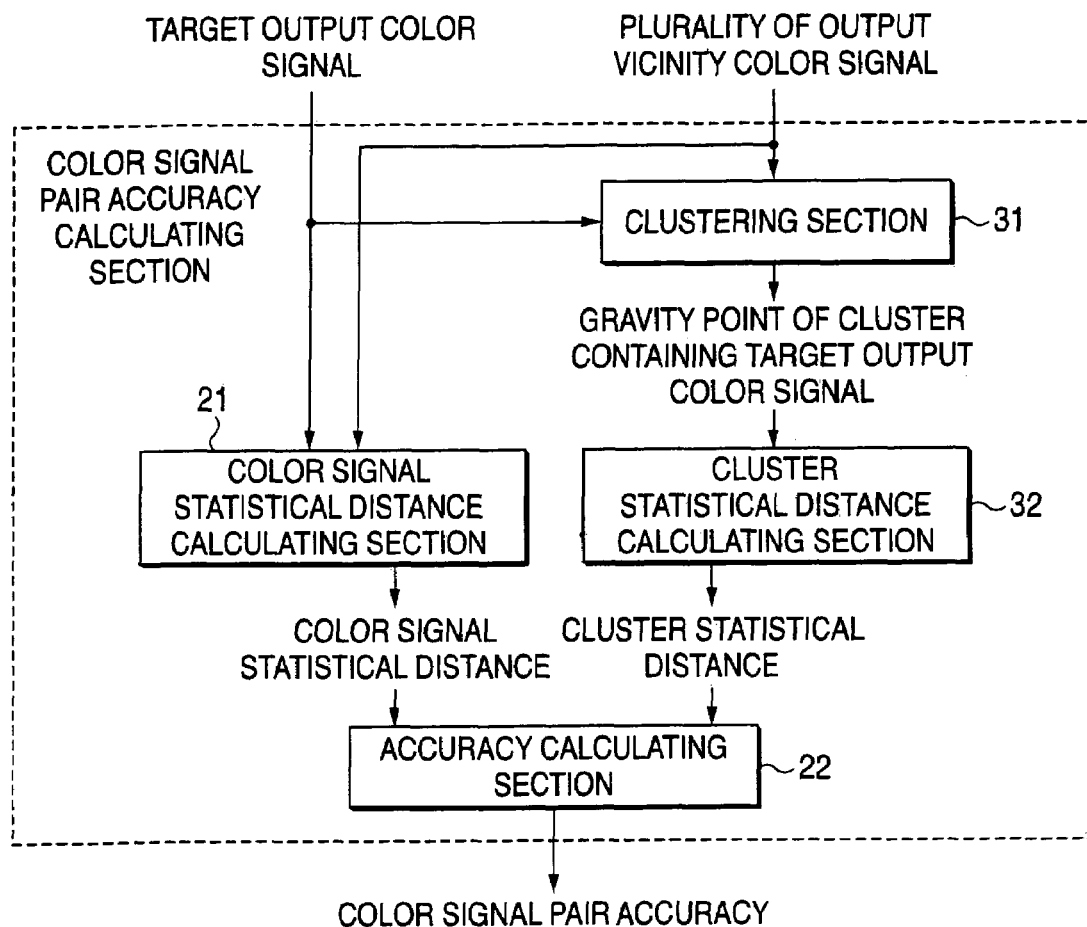
FIG. 5 is a block diagram for indicating a second example of a color signal pair accuracy calculating section used in the color data accuracy calculating apparatus according to the embodiment of the invention.
Figure 6:
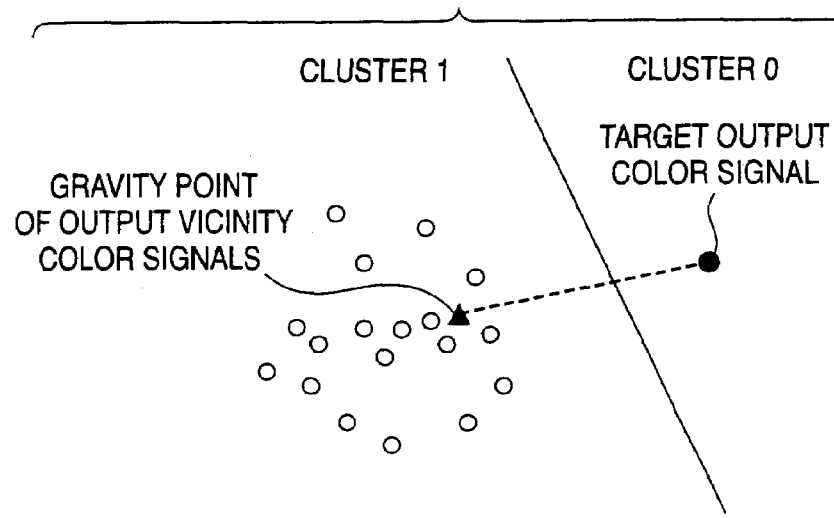
FIG. 6 is an explanatory diagram for indicating an example of a relation between a cluster statistical distance and a color signal statistical distance.

FIG. 5 is a block diagram showing a second example of the color signal pair accuracy calculating section 13 used in the color data accuracy calculating apparatus according to the embodiment of the invention. It should be noted that the same reference numerals as those shown in FIG. 2 denote the same or similar sections. Therefore, the same explanations thereof are omitted. In this drawing, reference numeral 31 denotes a clustering section, and reference numeral 32 denotes a cluster statistical distance calculating section. The clustering section 31 clusters a set of a target output color signal and a plurality of output vicinity color signals to form at least two clusters. The clustering may be carried out as follows: For example, when the above-described set is clustered to form two clusters, while the target output color signal and a signal, which are located at the furthest from the target color signal among the plural output vicinity color signals, are set as initial gravity points, the positions of the gravity points are updated using the K-means method. The set of these signals is divided into two clusters each having the gravity point, which has been finally converged by executing the clustering by way of the K-means method. As apparent from the foregoing description, in accordance with the invention, a total number of clusters to be clustered is not limited only to the two clusters, but the clustering for a plurality of clusters may be carried out.

The cluster statistical distance calculating section 32 calculates a cluster statistical distance, which is the statistical distance, based upon a gravity point of a cluster, which the target output color signal belongs to, of the clusters clustered by the clustering section 31 and the distribution of the output vicinity color signals. Also, in this case, the Mahalanobis distance may be used as the statistical distance.

The color signal statistical distance calculating section 21 is similar to that of the first example shown in FIG. 2. This color signal statistical distance calculating section 21 calculates a color signal statistical distance based on the target output color signal and the distribution of the output vicinity color signals.

The accuracy calculating section 22 calculates the color signal pair accuracy based on the two distances, which have been calculated as described above, namely, based on the cluster statistical distance calculated by the cluster statistical distance calculating section 32 and the color signal statistical distance calculated by the color signal statistical distance calculating section 21.

FIG. 6 to FIG. 10 are explanatory diagrams for explaining examples of relations between the cluster statistical distance and the color signal statistical distance. FIG. 6 to FIG. 10 indicate examples of distribution patterns, which are conceivable when a target output color signal and output vicinity color signals are clustered to form two clusters. In the example, a cluster containing the target output signal is assumed as a cluster "0", and the cluster other than this cluster "0" is assumed as a cluster "1" among the clusters clustered by the clustering section 31. An effect achieved by performing the clustering is given as follows. That is, when the target output color signal is abnormal, the cluster to which the target output color is completely classified to the cluster "0." Also, when abnormal values among the target output signal and the output vicinity color signals form a cluster, such cluster can be handled as a set of the abnormal values. It should be understood that in FIG. 6 to FIG. 10, a white circle indicates an output vicinity color signal, a black triangle shows a gravity point of a distribution of output vicinity color signals, a black circle represents a target output color signal, and a black rectangle indicates a gravity point of a signal, which belongs to a cluster (cluster "0") containing the target output signal.

Assuming now that a vector of the target output color signal is expressed as $x_t$; a gravity point vector of a distribution of the output vicinity color signals is expressed as $x_g$; a variance-covariance matrix of the distribution of the output vicinity color signals is expressed as S; a statistical distance between the target output color signal and the gravity point of the distribution of the output vicinity color signals is expressed as $D_t$; a gravity point vector of the cluster 0 is expressed as $x_0$; a statistical distance between the gravity point vector of the cluster 0 and the gravity point of the distribution of the output vicinity color signals is expressed as $D_0$; and the statistical distances are defined as the Mahalanobis distance, the statistical distances may be represented by the following formulae 2 and 3:

$$D_t = (x_t - x_g)^T S^{-1} (x_t - x_g) \quad (2)$$

$$D_0 = (x_0 - x_g)^T S^{-1} (x_0 - x_g) \quad (3)$$

It should be noted that the invention is not limited only to this example, but desired distances may be used so long as such distances include elements obtained by considering dispersion of the distribution of the output vicinity color signals, such as the variance-covariance matrix.

The accuracy calculating section calculates the accuracy of data using the cluster statistical distance $D_0$ calculated by the cluster statistical distance calculating section 32 and the color signal statistical distance $D_t$ calculated by the color signal statistical distance calculating section 21, as described above. In this second example, these distances $D_0$ and $D_t$ are summed with each other by way of, for example, the below-mentioned, formula 4 to obtain a total value D:

$$D = \sqrt{(d_t^2 + D_0^2)} \quad (4)$$

Figure 11A:
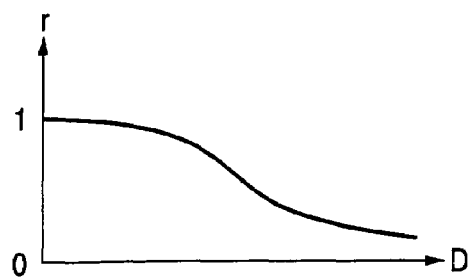
FIG. 11 is an explanatory diagram for indicating an example of an accuracy function used in a second example of the color signal pair accuracy calculating section.
Figure 11B:
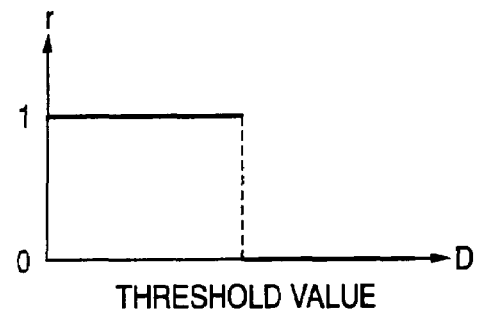

While this total value D is used, the color signal pair accuracy may be calculated by a accuracy function similar to that of the first example. FIG. 11 is an explanatory diagram for explaining an example of an accuracy function used in the color signal pair accuracy calculating section of the second example. The accuracy function shown in FIG. 11 is similar to the accuracy function shown in FIG. 4 of the first example. However, it is noted that an abscissa of FIG. 11 indicates the total value D. For instance, FIG. 11A represents an accuracy function:

$$r = 1/(1 + D^p) \text{ (p is constant)} \quad (5)$$

The color signal pair accuracy may be calculated by using this accuracy function. Apparently, the color signal pair accuracy may be calculated using an accuracy function shown in FIG. 11B. In other words, a function may be used, which has 0 indicating that the target output color signal is abnormal when the total value D is larger than a predetermined value; and outputs 1 indicating that the target output color signal is normal when the total value D is smaller than or equal to the predetermined value. Furthermore, other accuracy functions may be used.

Referring to the examples shown in FIG. 6 to FIG. 10, a description will be made on that the color signal pair accuracy calculated in the above-described manner becomes what kind of values. The example of FIG. 6 indicates a distribution pattern in which only the target output color signal is contained in the cluster 0. In the case of this distribution pattern, the target output color signal is far from the distribution of the output vicinity color signals. Therefore, since the Mahalanobis distances $D_t$ and $D_0$ measured between the target output color signal (that is, the gravity point of the cluster 0) and the distribution are large, the reliability r becomes small. As a result, in the case of the example of FIG. 6, the target output color signal may be regarded as data having a possibility that the accuracy thereof is low and has an abnormal value.

Figure 7:
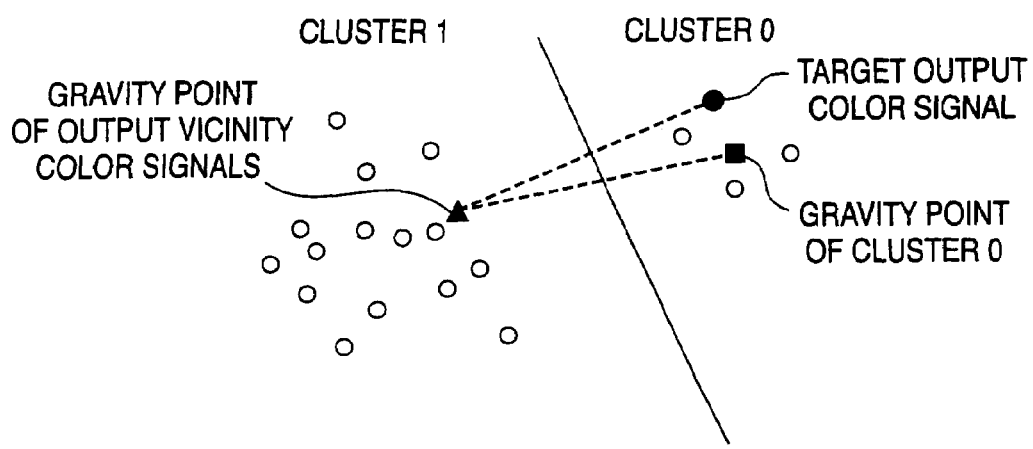
FIG. 7 is an explanatory diagram for representing another example of a relation between the cluster statistical distance and the color signal statistical distance.

The example of FIG. 7 indicates a distribution pattern in which the abnormal value including the target output color signal forms the cluster. In this case, the Mahalanobis distances $D_t$ and $D_0$ are large, and the reliability r becomes a small value. When the target output color signal may be regarded as data having a possibility that the target output color signal is an abnormal value. In addition, it is also possible to judge that the abnormal value forms the cluster.

Figure 8:
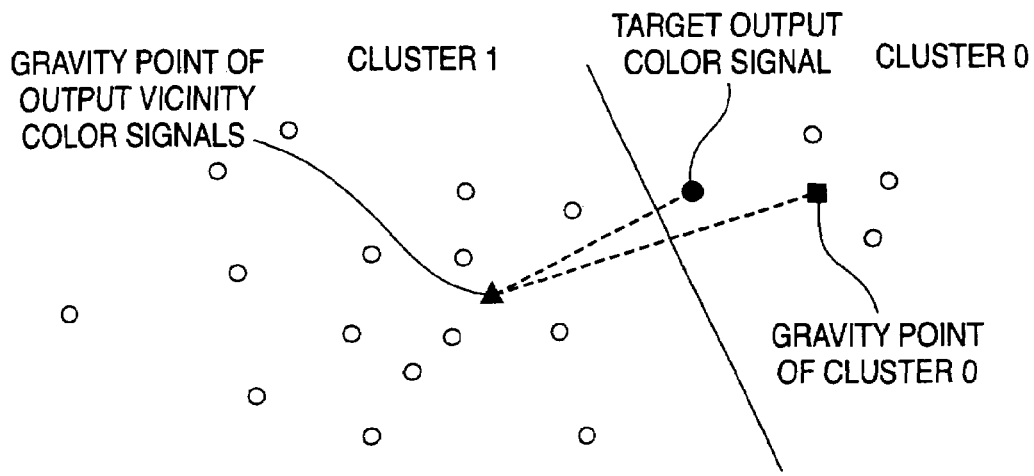
FIG. 8 is an explanatory diagram for indicating still another example of a relation between a cluster statistical distance and the color signal statistical distance.

The example of FIG. 8 indicates a distribution pattern in which the target output color signal is located between two groups of the output vicinity color signals. In the case of this distribution pattern, it is impossible to judge as to whether or not the target output color signal is the abnormal value based on only the Mahalanobis distance $D_t$. Because, as apparent from FIG. 8, the target output color signal may be regarded as a color signal contained in the distribution. In this case, the judgment is made based on the Mahalanobis distance $D_0$. If the Mahalanobis distance $D_0$ is large, the target output color signal is regarded as the abnormal value. All of these judgments can be automatically calculated using the formula 4 and formula 5.

Figure 9:
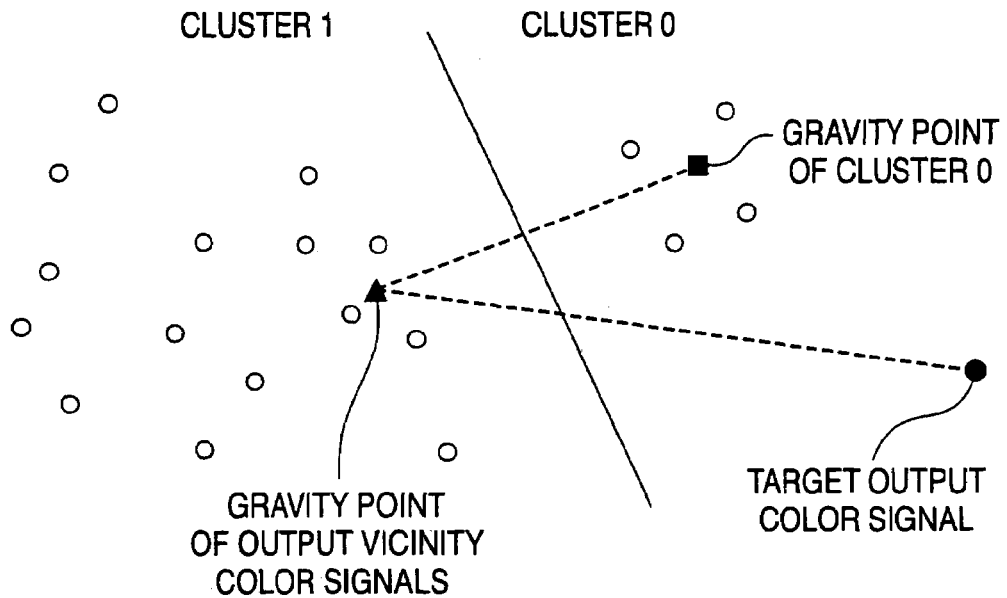
FIG. 9 is an explanatory diagram for representing further another example of a relation between the cluster statistical distance and the color signal statistical distance.

The example of FIG. 9 indicates a distribution pattern in which the abnormal value is also present in the output vicinity color signals, and the target output color signal indicates an abnormal value apart from the abnormal value in the output vicinity color signal. In the case of this distribution patter, it is clearly judged that the target output color signal is an abnormal value. If the Mahalanobis distance $D_0$ is large, the cluster 0 itself is abnormal. In addition, since the Mahalanobis distance $D_t$ is also large, the target output color signal is the abnormal value. This judgment also can be obtained from the formulae 4 and 5.

Figure 10:
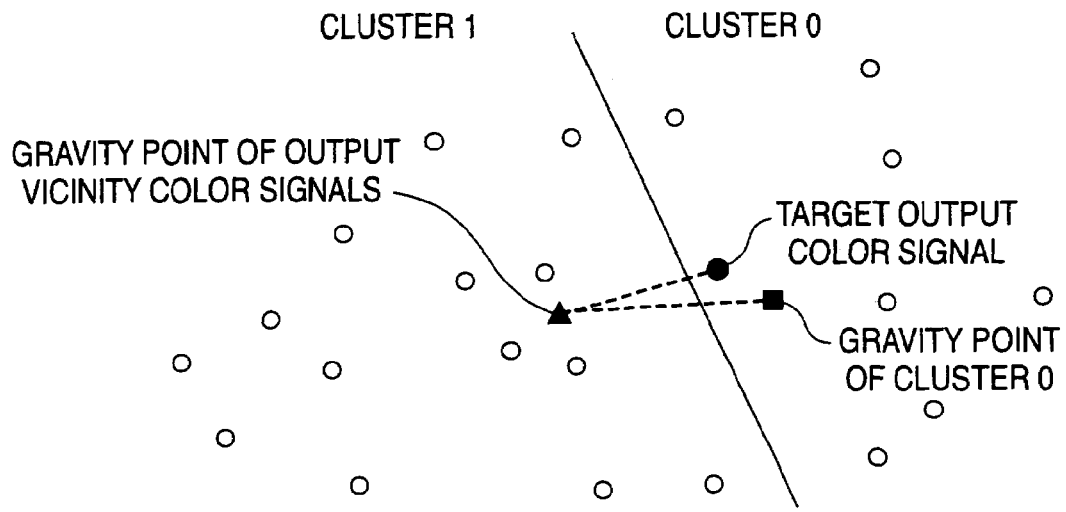
FIG. 10 is an explanatory diagram for representing still further another example of a relation between the cluster statistical distance and the color signal statistical distance.

The example of FIG. 10 indicates a distribution pattern in which the target output color signal is located in the distribution of the output vicinity color signals. In the case of this distribution pattern, the target output color signal is regarded as a normal value. As apparent from FIG. 10, the target output color signal and the distribution itself of the cluster 0 are also contained in the entire distribution of the output vicinity color signals. In this case, since the distributions are spread, the Mahalanobis distances $D_t$ and $D_0$ are small values, so that a total value D is also a small value. As a result, the reliability r calculated in accordance with the formula 5 is a large value.

As described above, in the second example of the color signal pair calculating unit 13, the color signal pair accuracy is calculated using the distance $D_t$ between the target output color signal and the distribution of the output vicinity color signals, and the distance $D_0$ between the gravity point of the cluster including the target output color signal and the distribution of the output vicinity color signals. As a result, even when the abnormal value is present in the output vicinity color signals, the color signal pair accuracy indicating the correct judgment can be calculated.

It should also be noted that in the above explanations, the more abnormal the target output color signal is, the smaller the color signal pair accuracy is. However, the invention is not limited thereto. For instance, when the target output color signal is abnormal, the color signal pair accuracy may alternatively be large. For example, inverse numbers of the formulae 1 or 5 may be calculated as the color signal pair accuracy.

Figure 12:
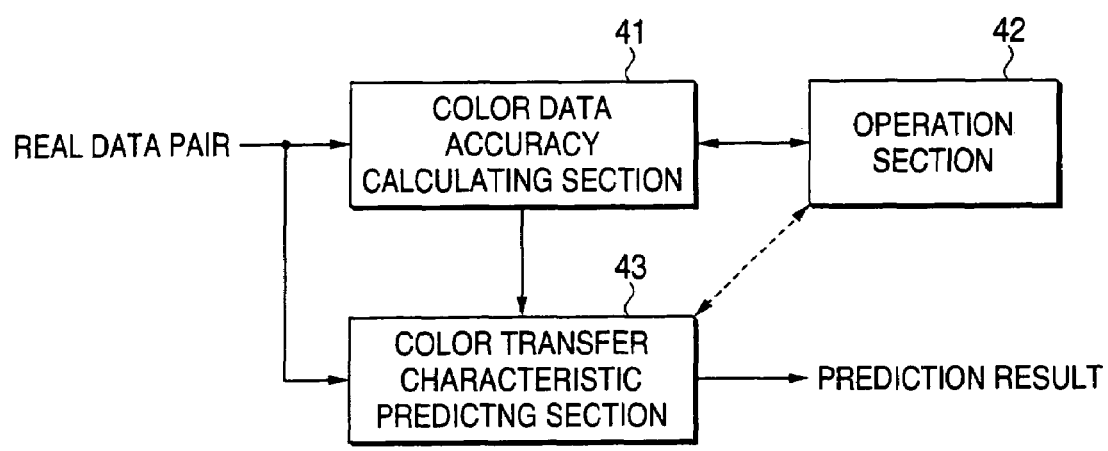
FIG. 12 is a block diagram for representing a color processing apparatus according to the embodiment of the invention.

FIG. 12 is a block diagram for indicating a color processing apparatus according to an embodiment of the invention. In this drawing, reference numeral 41 denotes a color data accuracy calculating section, reference numeral 42 denotes an operation section, and reference numeral 43 denotes a color transfer characteristic predicting section. It should also be noted that the following description also indicates a color processing method according to an embodiment of the invention.

The color data accuracy calculating section 41 includes the configuration described as the color data accuracy calculating apparatus according one embodiment of the invention. This color data accuracy calculating section 41 calculates a color signal pair accuracy for either all or a portion of real data pairs. Furthermore, the color data accuracy calculating section 41 checks as to whether or not a real data pair is in tolerance based on the calculated the color signal pair accuracy, and outputs this check result to the operation section 42. As to the check result output to the operation section 42, when the color signal pair accuracy is outside the tolerance, the color data accuracy calculating section 41 may alternatively output this check result as an abnormal value. The color data accuracy calculating section 41 also outputs the color signal pair accuracy to the color transfer characteristic predicting section 43.

The operation section 42 receives an instruction issued from a user, or provides the user with information. The operation section 42 can instruct a commencement of an execution of the calculation to the color data accuracy calculating section 41, or can provide to the user, the check result made by the color data accuracy calculating section 41, for example, information related to a real data pair, which is judged as an abnormal value. The operation section 42 may be configured to be able to issue an instruction to the color transfer characteristic predicting section 43.

A specific operation of the color transfer characteristic predicting section 43 will be described below. Before predicting the color transfer characteristic, the color transfer characteristic predicting section 43 obtains a color prediction model (function) F expressed as follow.

$$F(\text{input color signal}) = \text{predicted output color signal} \quad (6)$$

where the input color signal and the predicted output color signal may be L*a*b* signal, RGB signal, CMYK signal, or the like. The color prediction model F is obtained using the real data pair and the calculated color signal pair accuracies by means of known methods such as the regression analysis, the neural network, or the like (for example, disclosed in JP-A-10-262157, which is incorporated herein by reference in its entirety). When the user requires to predict an output color signal from an input color signal, the output color signal in question can be obtained from the formula 6. If the user requires to predict an input color signal from an output color signal, it is necessary to obtain $F^{-1}$ (inverse function of F). We can obtain $F^{-1}$ by means of algebraic calculation, searching, or the like (for example, disclosed in JP-A-10-262157).

$$F^{-1}(\text{output color signal}) = \text{predicted input color signal} \quad (7)$$

Then, the input color signal in question is obtained from formula 7.

As described above, the CMYK printer forms the patch from the CMYK patch data 51 and the L*a*b* calorimetric value data 52 is obtained by measuring the patch calorimetrically. Therefore, the color transfer characteristic predicting section 43 obtains the color prediction model F expressed by:

$$F(L^*,a^*,b^*)=(C,M,Y,K) \quad (8)$$

On the other hand, generally, L*a*b* signals are given to the CMYK printer to form a color image with cyan, magenta, yellow, and black inks. Therefore, it is often required to predict the CMYK signal from the L*a*b* signal. In this case, $F^{-1}$ is used rather than F. However, since the prediction from the L*a*b* signal to the CMYK signal is a prediction from three dimensions to four dimensions, values of C, M, Y, and K cannot be determined uniquely. Therefore, first K signal, that is, one of the CMYK signal is given in advance. We can express this situation as follow.

$$F^{-1}(L^*,a^*,b^*,K)=(C,M,Y) \quad (9)$$

Then, the remaining C, M, and Y signals are determined. The value of the K signal can be determined by means of known methods (for example, JP-A-10-262157).

The color transfer characteristic predicting section 43 predicts a color transfer characteristic in either in a color image input apparatus or a color image output apparatus based on a real data pair. At this time, the color transfer characteristic predicting section 43 reflects the color signal pair accuracy calculated by the color data accuracy calculating section 41 on this predicting. As a method of reflecting the color signal pair accuracy, for example, this color signal pair accuracy is used as a weight with respect to each of the real data pair. Thus, the color transfer characteristic predicting section 43 may predict a color transfer characteristic, while the color signal pair accuracy is used as a small weight or a zero weight with respect to the real data pair whose accuracy is deteriorated. Alternatively, the color transfer characteristic predicting section 43 may predict a color transfer characteristic only when the color signal pair accuracy is in a predetermined range, or may predict a color transfer characteristic by eliminating the real data pair whose accuracy is deteriorated. Since the color signal pair accuracy is reflected to the prediction of the color transfer characteristic, even when the abnormal value is contained in the given real data pair and the prediction is conducted with such abnormal value being contained, a desirable color transfer characteristic similar to that predicted under no abnormal value can be predicted. Alternatively, the color transfer characteristic predicting section 43 may predict the color transfer characteristic by eliminating the abnormal value and thus, may execute a desirable color transfer characteristic predicting process. It should also be understood that the method described in, for instance, JP-A-10-262157, which is incorporated herein by reference in its entirety, or various sorts of known methods may be used as the color transfer characteristic predicting process.

Figure 13:
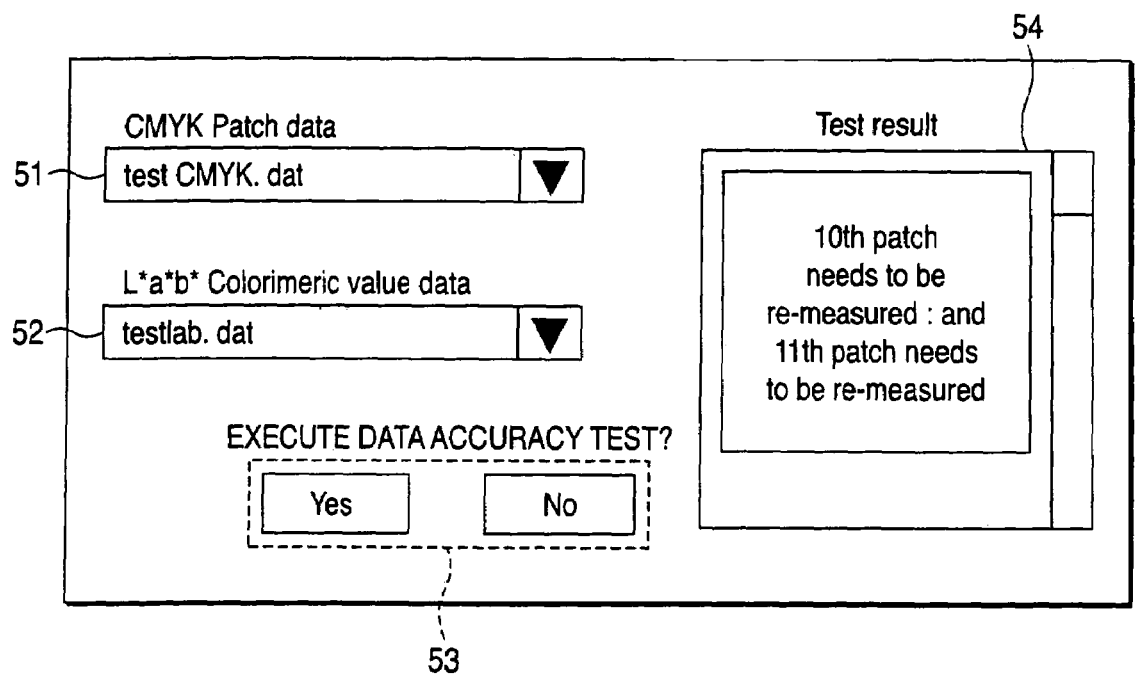
FIG. 13 is an explanatory diagram for indicating an example of a display screen of an operation section used in the color processing apparatus according to the embodiment of the invention.

FIG. 13 is an explanatory diagram for showing an example of a display screen of the operation section 42 used in the color processing apparatus according to the embodiment of the invention. In this drawing, reference numeral 51 denotes a patch data file select/input region, reference numeral 52 denotes a calorimetric value data file select/input region, reference numeral 53 denotes an instruction button, and reference numeral 54 denotes a check result display region. In one example of the display screen shown in FIG. 13, the patch data file select/input region 51, the colorimetric value data file select/input region 52, two instruction buttons 53, and the check result display region 54 are provided. The patch data file select/input region 51 is a region for selecting/inputting a file into which data of an input color signal has been stored. In this embodiment, a file name is input, which is used when a patch image is output from a CMYK printer. In this case, a file "testCMYK.dat" is selected. Alternatively, a file name may be selected by designating an inversed triangle located on the right side of the column.

The calorimetric value data file select/input region 52 is a region for selecting/inputting a file into which data of an output color signal has been stored, that is, data obtained by calorimetrically measuring a patch image has been stored. In this example, a file "testLab.dat" is selected. Alternatively, a file name may be selected by designating an inversed triangle located on the right side of the column.

The two files are read, which have been selected/input in the patch data file select/input region 51 and the colorimetric data file select/input region 52. Then, data located at positions corresponding to the two files constitute a real data pair.

The two instruction buttons 53 are used so that the user instructs as to whether or not commencing an execution of the calculation process of the color signal pair accuracy in the color data accuracy calculating section 41. When the user operates the instruction button 53 of "YES", the color data accuracy calculating section 41 commences the execution of the calculating process of the color signal pair accuracy. When the user operates the instruction button 53 of "NO", the color data accuracy calculating section 41 doesn't execute the calculating process of the color signal pair accuracy, but the display screen shown in FIG. 13 is ended.

On the check result display region 54, a result is displayed, which is obtained by executing the calculation of the color signal pair accuracy in the color data accuracy calculating section 41. In this example, a result is displayed, which indicates that abnormal values are detected from a 10th real data pair and an 11th real data pair. As described above, the information related to the real data pairs indicating the abnormal values may be displayed on this check result display region 54 to notify this fact to the user. At this time, when an abnormal degree is indicated in a numeral value as the color signal pair accuracy (for example, when the accuracy function as shown in FIG. 4A or FIG. 7A are used), other degrees higher than or equal to this abnormal degree may be displayed. It should be understood that if there is no abnormal value, a message of "no abnormal value" is displayed on the check result display region 54.

After the calculating process operation of the color signal pair accuracy has been accomplished, the color transfer characteristic predicting process by the color transfer characteristic predicting section 43 may be automatically commenced. Alternatively, the user maybe prompted to instruct the commencement of the color transfer characteristic predicting process. Or, when an abnormal value is not detected, the color transfer characteristic predicting process by the color transfer characteristic predicting section 43 may be automatically commenced, whereas when an abnormal value is detected, the user maybe prompted to instruct the commencement of the color transfer characteristic process.

As described above, since the color signal pair accuracy is calculated and the calculation result is provided to the user, when the abnormal value is contained in the real data pair, the user can grasp this abnormal condition in advance. On the contrary, conventionally, while the user does not know a fact that the abnormal value is contained in the real data pair, the color predicting process has been carried out, so that the intended color prediction could not be carried out. The invention can solve this problem. As described above, the color transfer characteristic predicting section 43 can essentially remove the adverse influence caused by the abnormal value in such a manner that the abnormal value is eliminated, or the weight is decreased, and thus, can execute the predicting process of the color transfer characteristic. As a consequence, the desirable color prediction result can be obtained.

Figure 14:
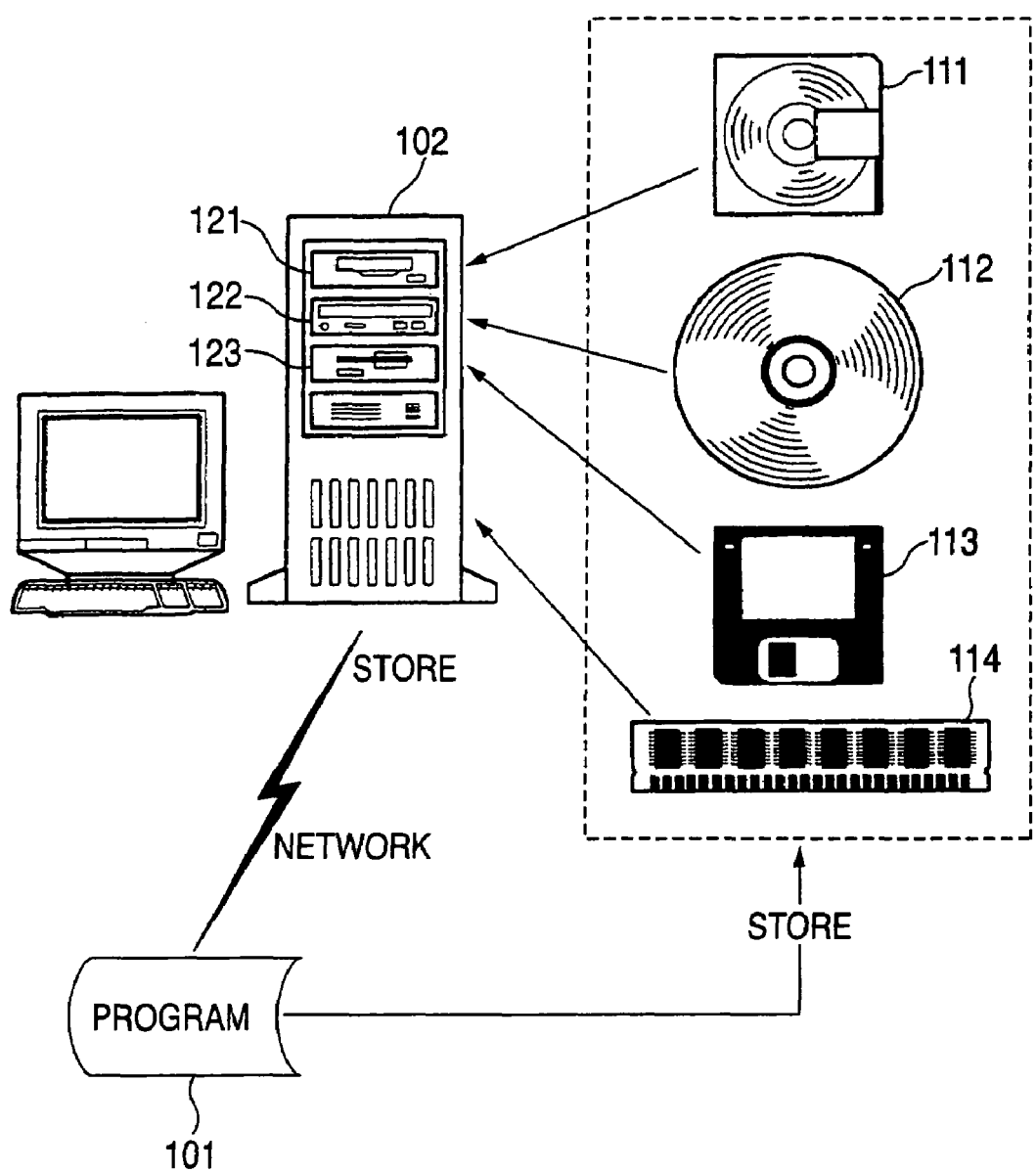
FIG. 14 is an explanatory diagram for explaining an example of a computer program and a storage medium into which this computer program has been stored, while this computer program may realize the function of either the color data accuracy calculating apparatus or the color processing apparatus, according to the embodiment of the invention, or either the color data accuracy calculating method or the color processing method, according to the embodiment of the invention.

FIG. 14 is an explanatory diagram for explaining an example of a computer program and a storage medium into which this computer program is stored. This computer program may realize the function of the color data accuracy calculating apparatus of the invention, the function of the color processing apparatus of the invention, the color data accuracy calculating method of the invention, or the color processing method of the invention. In this drawing, reference numeral 101 denotes a program, reference numeral 102 denotes a computer, reference numeral 111 denotes a magneto-optical disk, reference numeral 112 denotes an optical disk, reference numeral 113 denotes a magnetic disk, reference numeral 114 denotes a memory, reference numeral 121 denotes a magneto-optical disk apparatus, reference numeral 122 denotes an optical disk apparatus, and reference numeral 123 denotes a magnetic disk apparatus.

The function indicated as one embodiment of the color data accuracy calculating apparatus according to the invention, the color data accuracy calculating method described in this explanation, and the function indicated as one embodiment of the color processing apparatus according to the invention and the color processing method described in this explanation may also be realized by the program 101 executable by a computer. In this case, this program 101, data used in this program 101, the function of the color processing apparatus according to the embodiment of the invention, or color prediction data formed using the color processing method according to the embodiment of the invention may be stored into a computer-readable storage medium. This computer-readable storage medium implies a medium that with respect to a reading apparatus provided in a hardware resource of a computer, a changing status of energy such as magnetic energy, optical energy, and electric energy is induced in response to a content described in a program, and then, the content described in the program may be transferred to the reading apparatus in the form of a signal corresponding thereto. For example, this storage medium corresponds to the magneto-optical disk 111, the optical disk 112 such as a CD and a DVD, the magnetic disk 113, the memory 114 (including IC card and memory card), and the like. Apparently, these storage media is not limited only to portable type storage media.

While the program 101 has been stored into any one of these storage media, since a storage medium of these storage media is mounted on, for example, the magneto-optical disk apparatus 121, the optical disk apparatus 122, the magnetic disk apparatus 123 of the computer 102, or a memory slot (not shown), the program 101 is read out from the computer 102, and then, the function of either the color data accuracy calculating apparatus or the color processing apparatus according to the present invention, or either the color data accuracy calculating method or the color processing method according to the present invention maybe carried out. Alternatively, while the storage medium is preciously mounted on the computer 102, the program 101 may be transferred to the computer 102 via, for example, a network, or the like, and then, this transferred program 101 may be stored in this storage medium so as to be executed. Apparently, a partial function of the present invention may be constituted by way of hardware. Otherwise, all of the above-described functions of the present invention may be constituted by employing hardware.

As apparent from the above-described explanations, in accordance with the embodiment of the invention, the real data pair regarded as an abnormal value can be correctly detected from the real data pairs with respect to either the color image input apparatus or the color image output apparatus, which own the respective characteristics. Also, according to the embodiment of the invention, as to the real data pair, which is approximated to the abnormal value, the accuracy thereof can be quantified. Furthermore, according to the embodiment of the invention, since the color signal pair accuracy with respect to the calculated real data pairs is reflected onto the color transfer characteristic prediction of the respective apparatuses, the colors can be predicted in higher accuracy. As a result, the failure of the output color caused by predicting the color containing the abnormal real data pair can be automatically solved. Also, before the color transfer characteristic is predicted, the user can previously grasp that the abnormal value is present in the real data pairs by referring to the calculated data accuracy. Therefore, there is an effect that the re-colorimetrical measuring operation of the color patch can be carried out as to only the abnormal real data pair.

What is claimed is:

1. A color data accuracy calculation method comprising:
using a computer, performing the steps of:
extracting from a plurality of color signal pairs each including an input color signal in an input color space and a counterpart output color signal in an output color space, a target color signal pair including a target input color signal and a counterpart target output color signal in the output color space, which is to be calculated an accuracy thereof;
extracting from the plurality of color signal pairs, a plurality of output vicinity color signals corresponding to a plurality of input vicinity color signals, which are located in the vicinity of the target input color signal in the input color space; and
calculating a color signal pair accuracy of the target color signal pair on the basis of a relation between the target output color signal and the plurality of output vicinity color signals,
wherein the calculating is calculating the color signal pair accuracy using a color signal statistical distance, which is a statistical distance between the target output color signal and the plurality of output vicinity color signals, and
wherein the calculating is calculating the color signal pair accuracy using a monotone decreasing and smooth function of the color signal statistical distance.

2. The method according to claim 1, wherein:
the color signal pair accuracy takes a value indicating abnormal when the color signal statistical distance is larger than a predetermined value; and
the color signal pair accuracy takes another value indicating normal when the color signal statistical distance is not larger than the predetermined value.

3. The method according to claim 1, wherein:
the calculating includes:
clustering the plurality of output vicinity color signals into at least two clusters; and
calculating the color signal pair accuracy using:
a cluster statistical distance between a gravity point of one of the clusters to which the target output color signal belongs and a distribution of the plurality of output vicinity color signals; and
a color statistical distance between the target output color signal and the distribution of the plurality of output vicinity color signals.

4. The method according to claim 3, wherein:
the calculating is calculating the color signal pair accuracy using a monotone decreasing and smooth function of a total distance, which is obtained from the color signal statistical distance and the cluster statistical distance.

5. The method according to claim 3, wherein:
the color signal pair accuracy takes a value indicating abnormal when a total distance, which is obtained from the color signal statistical distance and the cluster statistical distance, is larger than a predetermined value; and
the color signal pair accuracy takes another value indicating normal when the total distance is not larger than the predetermined value.

6. The method according to claim 1, wherein the statistical distance takes into consideration the dispersion of distribution of the output vicinity color signal.

7. A color process method comprising:
using a computer, performing the steps of:
extracting from a plurality of real data pairs each including:
an input color signal in an input color space to one of a color image input apparatus and a color image output apparatus; and
a counterpart output color signal in an output color space,
a target color signal pair including a target input color signal and a counterpart target output color signal in the output color space, which is to be calculated an accuracy thereof;
extracting from the plurality of real data pairs, a plurality of output vicinity color signals corresponding to a plurality of input vicinity color signals, which are located in the vicinity of the traget input color signal in the input color space;
calculating a color signal pair accuracy of the target color signal pair on the basis of a relation between the target output color signal and the plurality of output vicinity color signals;
repeating the extracting the target color signal pair, the extracting the output vicinity color signals, and the calculating the color signal pair accuracy while changing the target color signal pair to calculate accuracies of the real data pairs; and
calculating a prediction output color signal corresponding to a desired input color signal based on the real data pairs and the accuracies of the real data pairs,
wherein the calculating is calculating the color signal pair accuracy using a color signal statistical distance, which is a statistical distance between the target output color signal and the plurality of output vicinity color signals, and
wherein the calculating is calculating the color signal pair accuracy using a monotone decreasing and smooth function of the color signal statistical distance.

8. The method according to claim 7, further comprising:
when it is judged that at least one of the real data pairs is abnormal in the accuracy thereof, outputting at least one of the accuracy of the at least one of the real data pairs and information concerning the at least one of the real data pairs.

9. A color data accuracy calculation apparatus comprising:
a target color signal pair extraction section for extracting from a plurality of color signal pairs each including an input color signal in an input color space and a counterpart output color signal in an output color space, a target color signal pair including a target input color signal and a counterpart target output color signal in the output color space, which is to be calculated an accuracy thereof;
an output vicinity color signal extraction section for extracting from the plurality of color signal pairs, a plurality of output vicinity color signals corresponding to a plurality of input vicinity color signals, which are located in the vicinity of the target input color signal in the input color space; and
a color signal pair accuracy calculation section for calculating a color signal pair accuracy of the target color signal pair on the basis of a relation between the target output color signal and the plurality of output vicinity color signals,
wherein the color signal pair accuracy calculation section calculates the color signal pair accuracy using a color signal statistical distance, which is a statistical distance between the target output color signal and the plurality of output vicinity color signals, and
wherein the color signal pair accuracy calculation section calculates the color signal pair accuracy using a monotone decreasing and smooth function of the color signal statistical distance.

10. The apparatus according to claim 9, wherein:
the color signal pair accuracy calculation section calculates the color signal pair accuracy so that:
the color signal pair accuracy takes a value indicating abnormal when the color signal statistical distance is larger than a predetermined value; and
the color signal pair accuracy takes another value indicating normal when the color signal statistical distance is not larger than the predetermined value 11. The apparatus according to claim 9, wherein:
the color signal pair accuracy calculation section clusters the plurality of output vicinity color signals into at last two clusters; and
the color signal pair accuracy calculation section calculates a cluster statistical distance between a gravity point of one of the clusters to which the target output color signal belongs and distribution of the plurality of output vicinity color signals;
the color signal pair accuracy calculation section calculates a color statistical distance between the target output color signal and the distribution of the plurality of output vicinity color signals; and
the color signal pair accuracy calculation section calculates the color signal pair accuracy using the cluster statistical distance and the color signal statistical distance.

12. The apparatus according to claim 11, wherein:
the color signal pair accuracy calculation section calculates the color signal pair accuracy using a monotone decreasing and smooth function of a total distance, which is obtained from the color signal statistical distance and the cluster statistical distance.

13. The apparatus according to claim 11, wherein:
the color signal pair accuracy calculation section calculates the color signal pair accuracy so that:
the color signal pair accuracy takes a value indicating abnormal when a total distance, which is obtained from the color signal statistical distance and the cluster statistical distance, is larger than a predetermined value; and
the color signal pair accuracy takes another value indicating normal when the total distance is not larger than the predetermined value.

14. The apparatus according to claim 9, wherein the statistical distance is a distance with being taken dispersion of distribution of the output vicinity color signal into consideration.

15. A color process apparatus comprising:
a color signal pair accuracy calculation section includes:
a target color signal pair extraction section for extracting from a plurality of real data pairs each including:

an input color signal in an input color space to one of a color image input apparatus and a color image output apparatus; and a counterpart output color signal in an output color space, a target color signal pair including a target input color signal and a counterpart target output color signal in the output color space, which is to be calculated an accuracy thereof;

an output vicinity color signal extraction section for extracting from the plurality of real data pairs, a plurality of output vicinity color signals corresponding to a plurality of input vicinity color signals, which are located in the vicinity of the target input color signal in the input color space;

calculation section for calculating a color signal pair accuracy of the target color signal pair on the basis of a relation between the target output color signal and the plurality of output vicinity color signals, wherein the color signal pair accuracy calculation section calculates accuracies of the real data pairs; and a prediction output color signal calculation section for calculating a prediction output color signal corresponding to a desired input color signal based on the real data pairs and the accuracies of the real data pairs, wherein the color signal pair accuracy calculation section calculates the color signal pair accuracy using a color signal statistical distance, which is a statistical distance between the target output color signal and the plurality of output vicinity color signals, and wherein the color signal pair accuracy calculation section calculates the color signal pair accuracy using a monotone decreasing and smooth function of the color signal statistical distance.

16. The apparatus according to claim 15, further comprising:

an output section, wherein:

when it is judged that at least one of the real data pairs is abnormal in the accuracy thereof, the output section outputs at least one of the accuracy of the at least one of the real data pairs and information concerning the at least one of the real data pairs.

17. A computer readable recoding medium storing a color data accuracy calculation program causing a computer to execute a process comprising:

extracting from a plurality of color signal pairs each including an input color signal in an input color space and a counterpart output color signal in an output color space, a target color signal pair including a target input color signal and a counterpart target output color signal in the output color space, which is to be calculated an accuracy thereof;

extracting from the plurality of color signal pairs, a plurality of output vicinity color signals corresponding to a plurality of input vicinity color signals, which are located in the vicinity of the target input color signal in the input color space; and calculating a color signal pair accuracy of the target color signal pair on the basis of a relation between the target output color signal and the plurality of output vicinity color signals, wherein the calculating is calculating the color signal pair accuracy using a color signal statistical distance, which is a statistical distance between the target output color signal and the plurality of output vicinity color signals, and wherein the calculating is calculating the color signal pair accuracy using a monotone decreasing and smooth function of the color signal statistical distance.

18. A computer readable recording medium storing a color process program causing a computer to execute a process comprising:

extracting from a plurality of real data pairs each including:

an input color signal in an input color space to one of a color image input apparatus and a color image output apparatus; and a counterpart output color signal in an output color space, a target color signal pair including a target input color signal and a counterpart target output color signal in the output color space, which is to be calculated an accuracy thereof;

extracting from the plurality of real data pairs, a plurality of output vicinity color signals corresponding to a plurality of input vicinity color signals, which are located in the vicinity of the target input color signal in the input color space;

calculating a color signal pair accuracy of the target color signal pair on the basis of a relation between the target output color signal and the plurality of output vicinity color signals;

wherein the calculating is calculating the color signal pair accuracy using a color signal statistical distance, which is a statistical distance between the target output color signal and the plurality of output vicinity color signals, and wherein the calculating is calculating the color signal pair accuracy using a monotone decreasing and smooth function of the color signal statistical distance.

repeating the extracting the target color signal pair, the extracting the output vicinity color signals, and the calculating the color signal pair accuracy while changing the target color signal pair to calculate accuracies of the real data pairs; and calculating a prediction output color signal corresponding to a desired input color signal based on the real data pairs and the accuracies of the real data pairs.

* * * * *